May 27, 1958
C. M. ROSE
2,835,980
DIAL INDICATORS
Filed Dec. 13, 1956
2 Sheets-Sheet 1
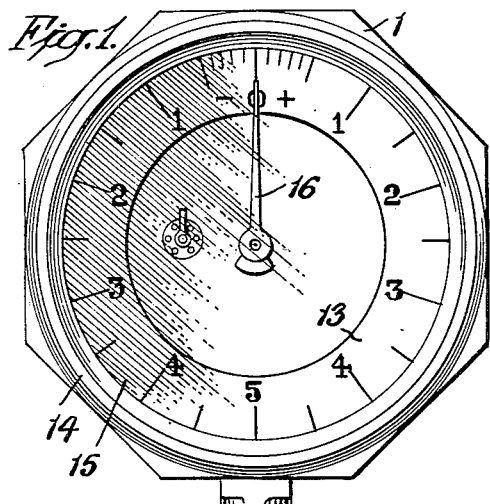
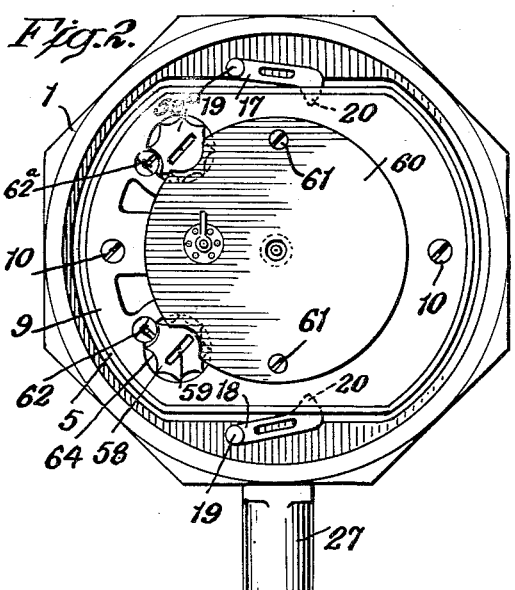
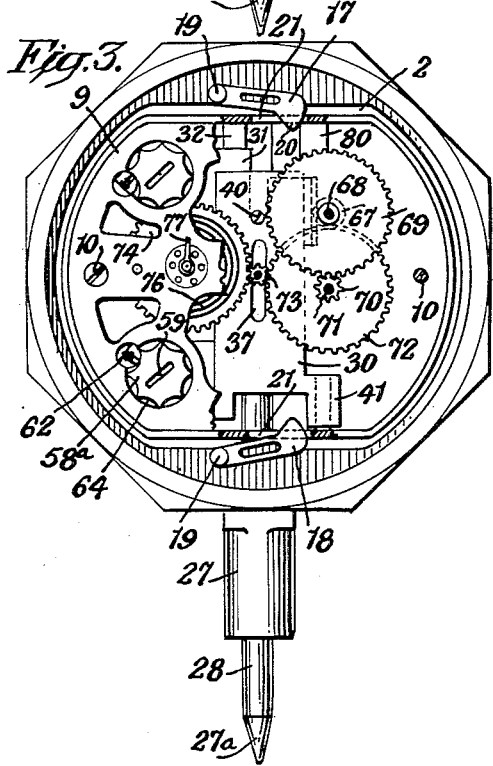
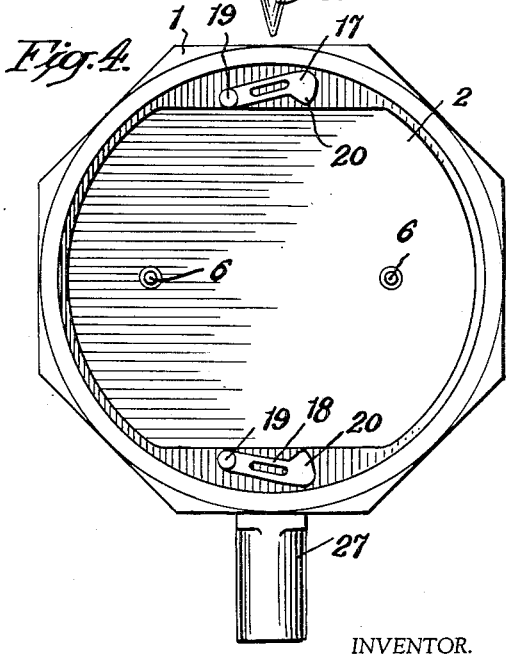
INVENTOR.
CHARLES M. ROSE
BY
Harry Radzinsky
ATTORNEY

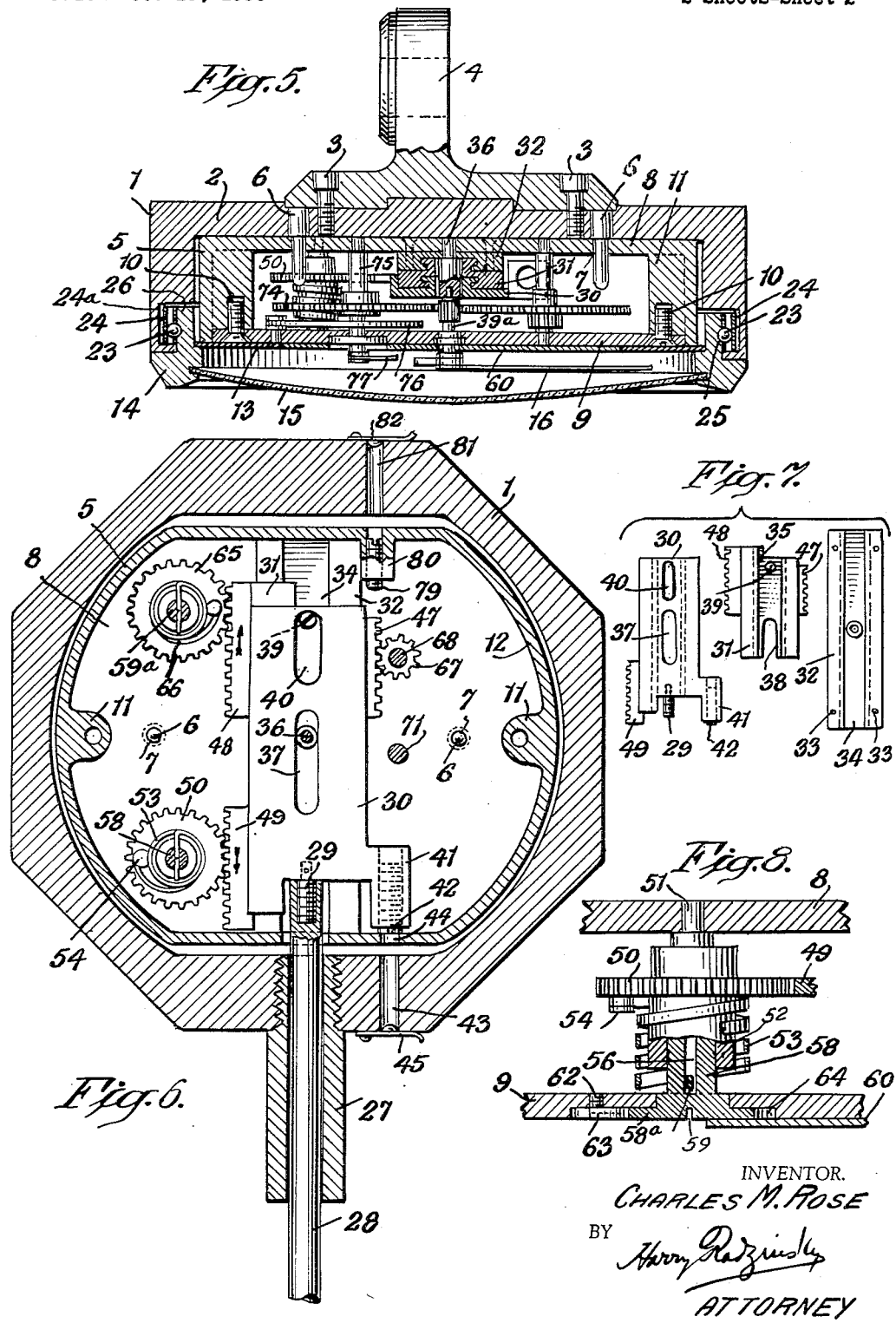

United States Patent Office 2,835,980
Patented May 27, 1958

2,835,980

DIAL INDICATORS

Charles M. Rose, Westfield, N. J.

Application December 13, 1956, Serial No. 628,020

8 Claims. (Cl. 33—172)

This invention relates to dial indicators, and has for its primary object the provision of a device of this kind of simplified, rugged construction, with is mechanism and parts thereof arranged for easy removal, repair or replacement.

It is an object of the invention to provide an indicator having its operating elements or movement unitarily housed in a casing and from which the casing and its contained movement are easily removed for adjustment, repair or replacement without requiring dismounting of the housing.

It is an object of the invention to provide a novel means for adjustment of the tension of torsional springs employed in the indicator movement; to provide a novel construction of operating slide, and to provide other constructional features to be hereinafter pointed out and which result in a sturdy indicator or gauge capable of accurately recording measurements and able to withstand the use and sometimes abuse to which these instruments are subjected.

With these, and other objects to be hereinafter described in view, I have devised the arrangement of parts to be disclosed and more particularly pointed out in the claims appended hereto.

In the accompanying drawings, wherein an illustrative embodiment of the invention is disclosed, Fig. 1 is a front elevational view of a dial indicator constructed in accordance with the invention;

Fig. 2 is a similar view, but with the crystal, bezel and dial removed;

Fig. 3 is a similar view, with the front closure plate of the movement casing broken away to disclose the mechanism contained in the casing, parts of the casing being shown in section;

Fig. 4 is a front elevational view of the housing;

Fig. 5 is a horizontal sectional view through the indicator;

Fig. 6 is a vertical sectional view through the indicator;

Fig. 7 is a face view of the three main parts of the slide, and

Fig. 8 is a view showing one of the torsional springs for the slide elements and associated parts including the adjusting means for the spring.

The enclosure means for the indicator includes a cup-shaped outer member of housing 1, which is shown as being preferably, but not necessarily, of external octagonal shape. Firmly secured to the rear wall 2 of the housing, by screws 3 or equivalent fastening elements, is an arm 4 by means of which the indicator may be supported from a suitable mounting or other element of known construction.

The operating mechanism, or movement of the indicator, to be presently described, is contained within an inner casing 5 that fits within the housing 1, so that it may at any time, be removed as a unit from within the housing 1, while permitting the housing to remain attached to any support to which the arm 4 is secured.

For accurately positioning the movement casing 5 within the housing 1, two guide pins 6 are provided, these pins being fixedly anchored in the rear wall 2 of the housing 1 and they project forwardly through holes 7 formed in the rear wall 8 of the casing.

The casing 5 is retained within the housing 1 by the two latches respectively indicated at 17 and 18 in Figs. 2 to 4 inclusive. Each of these latches is pivoted at one end in the wall of the housing 1 on a pivot pin 19, and each latch is formed with a nose 20 adapted, when the latch is in its operative or latching position, to enter an aperture 21 in the circumferential wall 12 of the movement casing 5. The latches are arranged to pivot with some friction on their pivot pins 19, thereby retaining them in either the advanced or latched position shown in Figs. 2 and 3, or in the retracted or unlatched position of Fig. 4. When it is desired to remove the casing 5 and its contents as a unit from within the housing 1, the latches are retracted to the position shown in Fig. 4, in which position the noses 20 are positioned out of the apertures 21, thus freeing the casing 5 and enabling it to be taken out of the housing 1.

The front of the casing 5 is closed by a disk-shaped plate 9, secured in place by the screws 10 which threadably enter the bosses 11 provided on the circumferential wall 12 of the casing 5. The dial 13 of the indicator is in the form of an annulus and is disposed flatly against the face of the closure plate 9 and encircles a central disk 60. Closure plate 9 co-operates with the rear wall 8 of the casing for the support of a number of the elements of the indicating mechanism in a manner to be described.

The bezel 14 for the front of the housing 1 carries a crystal or other transparent window 15, through which the face of the dial 13, and the indicating hand 16 moveable thereover, are visible.

The bezel 14 is removably attached to the front of the housing 1 by a snap engagement therewith, this being secured by means of balls 23 maintained in a groove 24a in the housing by means of spring leaves 24, and which balls 23 engage in a groove 25 (Fig. 5) provided in the periphery of the flange 26 of the bezel. By this means, or by some other suitable retaining means for the bezel, the bezel 14 is removably retained in place on the housing in a manner to permit of its speedy removal and replacement when required.

Threadably fitted in the wall of the housing 1 at the lower end of the same is a guide sleeve 27 through which the gauging stem 28 of the instrument is axially slidable. The stem 28 is provided at its free end with the pointed extremity 27a and at its opposite end it is provided with an internally threaded bore for engagement with the threaded stud 29 projecting from a slide element 30. The slide of which the element 30 forms a part, is composed of the three main elements shown in Fig. 7 and indicated respectively at 30, 31 and 32. The element shown at 32 constitutes a fixed grooved guide that is secured to the inner face of the rear wall 8 of the casing 5 by screws entering through the holes indicated at 33 in Fig. 7. The guide 32 is formed with a longitudinally-extending undercut or dovetail groove 34 into which a complementary tongue portion on the slide member 31 fits and in which it is slidably guided. The slide member 31 is herein, for convenience, referred to as the "inner slide member." Provided in the outer face of the inner slide member 31 is an undercut groove 35 into which a complementary tongue part on the back of the outer slide member 30 fits and is slidably guided.

Fixedly secured in the rear wall 8 of the casing 5 is a roller-bearing pin 36 which extends through a central longitudinal slot 37 formed in the outer slide member 30, and the inner slide member 31 is notched in one end, as indicated at 38, in order to clear the pin. The pin serves as a bearing for one end of a spindle 39a which carries the hand or pointer 16. Near its opposite end the inner slide member 31 is provided with a pin indicated at 39, and a slot 40 provided in the outer slide member 30 fits around the pin 39 and co-operates therewith in a manner to be presently described.

At one end the outer slide member 30 is provided with a lug 41 in which a stop screw 42 is threadably adjustable, this screw being accessible from the outside of the housing 1 through an aperture 43 formed through the wall of the housing and normally closed by the movable spring dust plate 45. An opening 44 in the casing 5 is aligned with aperture 43 and with the end of the adjusting or stop screw 44 so that a screw driver can be entered through these registered openings to engage in the head of the screw.

Provided along one edge of the inner slide member 31 is a rack 47, and a rack 48 is provided along the opposite edge of the same slide member. On the outer slide member 30 near its lower end is provided a rack 49. The rack 49 is in meshed engagement with a gear 50 rotative on the spindle 51 mounted in the rear wall 8 of the casing 5. The gear 50 is provided with a hollow hub 52 surrounded by a torsional spring 53 having one end secured at 54 to the gear 50, and having its other end 55 engaged with a slot 56 in the shank of an adjusting member 58 which has its slotted shank fitting within the hollow hub 52. The adjusting member 58 extends through closure plate 9 and terminates in a peripherally notched head 58a formed with a slot 59 by which the adjusting member 58 may be rotatively moved to adjust the tension of the spring 53, through the use of a screw driver or other suitable tool entered into the slot 59. The disk 60 secured over the face of the closure plate 9 by the screws 61 (Fig. 2), holds the adjusting member against displacement. To retain the adjusting member 58 in any desired position of adjustment, a screw 62 threadably engages in the plate 9, and said screw is formed with a mutilated or semi-circular head adapted, when its arcuate portion fits within any one of the notches 64 in the head 58a, to prevent rotative movement of the adjusting member. On the other hand, when the screw 62 is turned so that the cutaway portion of its mutilated head faces the notched periphery of the head 58a, the adjusting member may be turned, by means of a screw driver, to any desired position of adjustment to regulate the tension of the spring 53.

The rack 48, provided on the inner slide member 31, is in mesh with a gear 65, and the spring 66, encircling the hollow hub of said gear is operative to tend to urge the slide member 31 in the direction of the arrow shown on the rack 48 in Fig. 6, or toward the top of the casing 5. The adjusting means for the spring 66 is similar to that described in respect to gear 50. That is to say, by rotative movement of the adjusting member 59a, the spring 66 can be placed under the required tension. A mutilated-head set screw 62a holds the adjusting member 59a in its position of adjustment.

The rack shown at 47, and carried by the inner slide member 31, is in mesh with a pinion 67 provided on a spindle 68, said spindle also carrying a gear 69 (Fig. 3) meshing with a pinion 70 on spindle 71 which also carries the gear 72. Gear 72 meshes with pinion 73 on spindle 39a and the pinion 73 meshes with a gear 74 on shaft 75 (Fig. 5) that is biased by the main spring 76. The main spring is adjustable as to its tension by means of a fingerpiece 77 exposed on the outside of disk 60. By this adjustment, the spring can be manually tensioned and gear 74 suitably spring-biased.

The operation of the indicator is briefly as follows:

When an article or element to be gauged is placed under the pointed end 27a of the stem 28, and the stem moved upwardly thereby, the upward movement of the stem will move the outer slide member 30 upwardly or in the same direction. As slot 40, formed in the slide member 30 is also carried upwardly, it tends to move away from the pin 39, but inner slide member 31 will follow such movement, the pin 39 being constantly maintained against the upper end of slot 40 by the urge of the spring 66 applied to gear 65. As the inner slide member 31 is moved, its rack 47 will rotate pinion 67, causing the spindle 39a to be rotated through the gear train consisting of the gearing 69, 70, 72 and 73. The hand or pointer 16, carried by the spindle, will thus be moved over the dial as indicated by the extent of the raising movement of the stem 28. At the same time, gear 74 will be rotated to increase tension in the main spring 76. A stop for the inner slide member 31 is provided as seen in Fig. 6, the same consisting of a stop screw 79 against which the end of the rack 47 contacts, said screw being threadably adjustable in a boss 80 provided on the side wall 12 of the casing. The stop screw 79 is accessible for adjustment through an opening 81 provided in the wall of the housing 1, said opening being normally closed by a pivoted dust cover 82.

When pressure against the end of the stem 28 is relieved, the slide member 30 will be retracted or will move downward to its position of rest, as shown in Fig. 6. This return or retracting movement is caused by spring 53 as well as by the operation of the main spring 76. As the outer slide member 30 moves downwardly, it will cause the inner slide member 31 to be moved in the same direction, due to the engagement of the pin 39 against the upper end of the slot 40, the combined bias exerted by springs 53 and 76 being sufficient to overcome the upward urge exerted by spring 66.

By adjustment of the stops 42 and 79 and by the adjustment of the tension of the several springs 53, 66 and 76, the indicator may be regulated to meet varying indicating requirements. The removal of all of the moving or operating parts of the device contained in casing 5 is done unitarily, first by detaching the stem 28; then removing the benzel 14 and its contained crystal, and then releasing the latches 17 and 18 and thereupon lifting the casing 5 and its contained mechanism out of housing 1. This permits the housing to remain attached to a machine or other apparatus and allows another movement to be quickly inserted and used pending the repair or adjustment of that which has been removed.

The described indicators also employ a reduced number of parts which are easily adjusted or regulated to suit indicating conditions and without the possibility of misadjustment or deformation of any of them under rough or careless treatment.

Having described a single embodiment of the invention, it is obvious that the same is not to be restricted thereto, but is broad enough to cover all structures coming within the scope of the annexed claims.

What I claim is:

1. In a dial indicator, an outer housing, an inner casing containing operable parts of the indicator, means for retaining the casing and its contents within the outer housing comprising a plurality of pivoted latches pivotally secured to the housing and movable to engage parts of the casing to retain the same immovably in place in the casing.

2. In a dial indicator, an outer cup-shaped housing, a casing containing the movement parts of the indicator, said casing fitted within the housing, latches located diametrically opposite one another on the housing, said latches being pivoted to the housing and being movable to extend into engagement with parts of the casing and hold the same from displacement out of the housing, the housing being provided with a radially-extending sleeve through which a stem is axially movable, and means within the casing threadably engaged by an end portion of the stem and from which the stem is disengageable when it is desired to remove the casing and its contents from position within the housing.

3. In a dial indicator, an outer, octagonal, cupped housing, an inner casing containing operable parts of the indicator, means for retaining the casing and its contents within the outer housing comprising a pair of pivoted latches pivotally secured at diametrically-opposite points to the wall of the housing and movable to engage in openings in the casing to retain the casing immovably in place in the housing.

4. In a dial indicator, an outer cup-shaped housing, a casing containing the movement parts of the indicator, said casing fitted within the housing, latches located diametrically opposite one another on the housing, said latches being pivoted to the housing and movable to extend into engagement with openings in the casing to hold the casing within the housing, the housing being provided with a radially-extending sleeve through which a stem is axially movable, means within the casing threadably engaged by an end portion of the stem and from which the stem is disengageable when it is desired to remove the casing and its contents from position within the housing, and guide means in the housing for engagement with the casing to properly position the casing in the housing.

5. In a dial indicator, a gauging member in the form of a stem, a slide consisting of a fixed groove guide member and a pair of slidable elements connected thereto, the first of said slide elements having a part fitting into the groove in the guide member and being slidable in said groove, the second slide element being slidably connected to the first slide element, the first slide element being provided with a pair of racks, gearing engaging one of the racks and coupled to an indicating pointer whereby movement of the rack will actuate the pointer, a spring-biased gear meshed with the second rack and operative to urge the first slide element in one direction, the second slide element having a rack, a spring-biased gear meshed therewith and tending to urge the second slide element in a direction opposite to that in which the first slide element is urged, and coupling means between the two slide elements by which the first slide element is caused to be a follower to the second slide element in both the advance and retractive movements of the first slide element, and means by which the stem is detachably coupled to the second slide element.

6. In a dial indicator, a slide contained within a casing, said slide including a fixed, grooved plate attached to a wall or casing, a first slide member having a tongue located in the groove of the plate and slidably guiding the slide member relatively to the plate, the first slide member being also provided with a groove, a second slide member having a tongue fitted in the latter groove and slidable therein, the first slide member having a pin, a slot in the second slide member receiving the pin, spring means operative upon the first slide member for constantly retaining the pin against one end of the slot to cause the first slide member to follow sliding movement of the second slide member and tending to urge said second slide member in a direction away from the first slide mamber, a pointer, and gearing between the first slide mamber and said pointer for moving the pointer on movement of the second slide member.

7. In a dial indicator, a housing, a casing fitted within the housing, actuating mechanism contained within the housing, latch means for retaining the casing in position within the housing, a slide having a first part, a stem attached to said part and projecting out of the casing and out of the housing for gauging contact, the slide having a second part slidably coupled to the first part, a guide fixed in the casing and in which the second part of the slide is slidable, the second part of the slide carrying a pair of racks, a gear train coupling one of the racks to an indicating pointer, a spring-biased gear in mesh with the second rack, the first part of the slide carrying a rack, a spring-biased gear in mesh with the same, means for varying the tension of both gears, and a main spring operative in the gear train and tending to urge the second part of the slide in a direction toward the first part.

8. In a dial indicator, a housing, a casing therein, a gauging member in the form of a stem, said stem passing through the housing and entering the casing, a slide consisting of a fixed grooved guide member secured to the rear wall of the casing, and a pair of slidable elements connected to the guide member, the first of said slide elements having a part fitting into the groove in the guide member and being slidable in said groove, the second slide element being slidably connected to the first slide element, the first slide element being provided with a pair of racks, gearing engaging one of the racks and coupled to an indicating pointer whereby movement of the rack will actuate the pointer, a spring-biased gear meshed with the second rack and operative to urge the first slide element in one direction, the second slide element having a rack, a spring-biased gear meshed therewith and tending to urge the second slide element in a direction opposite to that in which the first slide element is urged, coupling means between the two slide elements by means of which the first slide element is caused to be a follower to the second slide element in both the advance and retractive movements of the first slide element, and means by which the stem is detachably coupled to the second slide element.

References Cited in the file of this patent

UNITED STATES PATENTS

| | | |
|---|---|---|
| 1,617,485 | Hughes | Feb. 15, 1927 |
| 1,937,936 | Aldeborgh et al. | Dec. 5, 1933 |
| 2,117,267 | Ames | May 17, 1938 |
| 2,117,268 | Ames | May 17, 1938 |
| 2,178,745 | Emery | Nov. 7, 1939 |